Patented Feb. 27, 1934

1,949,375

UNITED STATES PATENT OFFICE 1,949,375

PREPARATION OF LYSED BACTERIAL PROTEINS FOR TOPICAL APPLICATION

Frank G. Jones, Indianapolis, Ind., assignor to Eli Lilly and Company, Indianapolis, Ind., a corporation of Indiana No Drawing. Application January 12, 1931
Serial No. 508,377

6 Claims. (Cl. 167—63)

It is the object of my invention to produce a healing preparation for effective topical application to areas of local infection.

It has been known for a number of years that certain lysed bacterial proteins have had certain lytic effects, mainly but not wholly specific on the species of bacteria from which they are derived. While lysed bacterial proteins of certain efficacy may be produced by simple autolysis, as the bacteria grow old in or on a culture medium, and such autolysed bacterial proteins are included in the broad scope of my invention, what I have more especially in mind as desirable for my invention are lysed bacterial proteins where the lysis is produced on relatively young bacteria by a lytic agent with which a culture of them is inoculated.

This latter lytic action has been studied and discussed by many investigators, probably starting with Twort in 1915 and d'Herelle in 1917. Their lysed bacterial proteins have apparently been produced by, and the lytic action above referred to is apparently in large part due to, a principle which d'Herelle called bacteriophage.

This lytic principle, or bacteriophage, is transmissible in series in bacterial cultures; so that on inoculating a culture with such lytic principle there is produced not only a lysis of the bacteria of such culture but also more of the lytic principle itself. The lysed bacterial proteins in the culture so lysed may be evaluated by the effect on other cultures of inoculations from the lysed culture.

The nature of the bacteriophage is probably not yet definitely settled. d'Herelle and many others have considered the bacteriophage to be a living organism, ultramicroscopic in size, and so small that it passed readily through the finest Berkefeld filters; and have considered it as an infinitesimal parasite that attacked and by lysis destroyed bacteria of the species from which it was derived. This view has apparently been strengthened by the fact that prior to my present invention the bacteriophage was rendered ineffective by all germicidal agents with which it was treated, such as phenol and cresol.

Others have regarded the bacteriophage as a ferment, or enzyme, of chemical character rather than a living organism. This latter view seems to be strengthened by one phase of my invention; according to which I have discovered that the presence of a certain type of germicide in sufficient concentration for high germicidal effectiveness does not render the bacteriophage ineffective under the accepted temperature conditions for storing biological preparations. Such accepted temperature conditions are desirably ice-box temperatures, of between 0° and 5° C.; but certainly not above ordinary room temperature of about 20° C.

That is, I have discovered that the transmissibility in series of the bacteriophage on successive decimal dilution, and its effectiveness on such dilution, are not materially affected by the presence of this type of germicide in concentrations of from 1/1000 to 1/100,000 (which is an effective germicidal range) so long as the temperature of storage does not exceed about 5° C.; and that such transmissibility in series and bacteriophage effectiveness are not greatly affected, although they are slightly affected after long storage, if the temperature is somewhat higher but not above about 20° C.; although if such storage is at higher temperatures than 20° C., such as incubator temperatures of about 37° C., both such transmissibility in series and such bacteriophage effectiveness gradually diminish either in the absence or in the presence of this germicide, but somewhat more rapidly in its presence, and substantially disappear after from about 4 to 12 weeks if this germicide is present and after a somewhat longer time if it is absent, the time depending upon the concentration of the germicide and the temperature of storage.

The type of germicide which I have found to be thus available is of a different class from the germicides ordinarily used as preservatives for biological products. It is of a class set forth in Reissue Patent No. 16,921, granted April 3, 1928, and in Patent No. 1,672,615, granted June 5, 1928, to Morris Selig Kharasch; and may be referred to as a water-soluble salt of a compound of mercury of the following general formula:

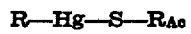
R—Hg—S—R$_{Ac}$ in which R is an aromatic or aliphatic group, R$_{Ac}$ is an organic radicle containing an acid group having a replaceable hydrogen ion, and the Hg and the S atoms are bonded to carbon atoms of the R group and R$_{Ac}$ group respectively. In these, I prefer that R shall be an aliphatic group. This class of compounds is perhaps best exemplified by sodium ethyl mercurithiosalicylate; which is a commercial preparation sold under the trade name of "Merthiolate".

Thus one phase of my invention is a composition of matter involving such a germicide in conjunction with effective lysed bacterial proteins, including bacteriophage as well as certain other components which will be discussed later.

These lysed bacterial proteins have heretofore been in a form which made them very unsatisfactory for topical application. Various schemes for applying them to infected areas and keeping them in place have been suggested and used. These included mere bathing of the infected parts, with the consequent briefness of effective application; and the use of frequently replaced wet packs saturated with the lysed bacterial proteins. None of these schemes for application has proven entirely satisfactory; but they have been the best and substantially the only methods of applying these lysed bacterial proteins topically, ever since the discovery of the bacteriophage so many years ago.

I have found that lysed bacterial proteins may be applied topically with great effectiveness, and permanence, and with a great increase in healing effect, if they are combined with a viscous smoothly smearable non-setting base which adheres to the infected area. Thus they may be combined with and form part of certain cerates, ointments, jellies, and lotions, to make a homogeneous mixture which when applied to the infected area, as by being smeared thereon, remains in place and thus holds the lysed bacterial proteins in effective contact with such infected area for a long time.

In addition, I have found that by combining the lysed bacterial proteins not only with such a viscous base but also with a germicide of the class previously indicated, particularly sodium ethyl mercurithiosalicylate (merthiolate), I attain certain further benefits, as follows:

(1) The germicide supplements the action of the lysed bacterial proteins, not only against bacterial homologous to those from which the lysed bacterial proteins were derived, but also against heterologous bacteria that may be present in addition to such homologous types.

(2) The infected area is kept free from secondary infection during the period of application.

(3) Sterility of the material—the lysed bacterial proteins in the viscous base—is very effectively maintained, both before and after application. This is especially desirable when a single container may be opened a number of times for successive applications of material therefrom, sometimes to different patients.

Various types of viscous smoothly smearable non-setting bases may be used. The ones I prefer are the following:

(1) Water-soluble jellies, as of tragacanth.
(2) Ointments, as of lanolin.
(3) Emulsions, as of cold-cream or vanishing cream.
(4) Heavy lotions, as of glycerin.

The lysed bacterial proteins used may be of various types, derived from different types of bacteria. The following are illustrations:

(1) The staphylococcus, aureus and/or albus.
(2) The acne bacillus.
(3) The coli bacillus.
(4) The gonococcus.
(5) A staphylococcus-acne mixture.
(6) A staphylococcus-coli mixture.
(7) A staphylococcus-gonococcus mixture.
(8) A staphylococcus-coli-gonococcus mixture.

These are merely examples, as other single-species or mixed-species lysed bacterial proteins may be used with a viscous smearable base, and my present invention is intended to include all such.

The lysed bacterial proteins of any species may be prepared from either a single strain (monovalent) or from a number of strains (polyvalent).

I give below three examples of how preparations involving my invention may be produced:

*Example I.—Mixed lysed staphylococcus proteins in water-soluble jelly*

Separate cultures of staphylococcus aureus and of staphylococcus albus are grown on agar slants. Separate veal-broth cultures are made from each of these agar slants once a week; and the separate broth cultures are transferred daily. In this way, the broth cultures are kept fresh, and the organisms young and viable. The aureus and albus strains are desirably kept wholly separate.

A quantity of veal-broth is made, and put in suitable flasks, conveniently Ehrlenmeyer flasks, and sterilized. The quantity in each flask is desirably such that the exposed surface is large in proportion to the depth. A convenient unit for handling is 500 cc. of broth in a 2000 cc. flask. The broth in each of these flasks is inoculated with a small quantity, usually from 0.1 to 0.01 cc., of an 18-hour broth culture of the desired staphylococcus; and the flasks are then incubated, say for 8 hours at about 38° C. By that time a heavy growth has generally appeared, and the broth is turbid.

To each flask is then added some corresponding lysed bacterial proteins from a previous homologous lot. The addition of a very small quantity, such as about 0.2 cc., is sufficient. The manner of obtaining these lysed bacterial proteins is known, from the work of previous investigators, and so the preparation of an initial lot need not be described.

After the addition of the lysed bacterial proteins to the flasks, the latter are incubated at about 38° C. for from 18 to 40 hours. The incubation is continued until substantially all the organisms are lysed, which is readily determined by the fact that the broth has then become clear.

It is this clear material that constitutes the complete lysed bacterial proteins. It probably contains at least four distinct components:

(1) The proteins of the bacteria, derived from their lysing.

(2) The transmissible lytic agent, or bacteriophage.

(3) The metabolic by-products, including the so-called "anti-virus", produced by the growth of the bacteria in the culture media.

(4) The proteins of the broth itself.

Probably all four of these elements are of value, but I regard them as of importance in about the order named; and by the term "lysed bacterial proteins" as used in the claims I intend to cover any or all of these elements so long as at least one of the first three is present.

To these lysed bacterial proteins as thus prepared, I add sodium ethyl mercurithiosalicylate, to a concentration of 1:5000; and then filter the material through a suitable sterilizing filter, such as a Berkefeld filter. The filtered material is then tested for sterility and titer, by any usual or desired methods.

The material so made and tested is used for the manufacture of the desired preparation for topical application, such for instance as a water-soluble jelly.

Preparation of water-soluble jelly:

The lysed bacterial proteins from the staphylococcus aureus and from the staphylococcus albus are mixed in suitable proportions. I have found that one suitable proportion is 90 parts of the lysed bacterial proteins from the staphylococcus aureus and 10 parts of the lysed bacterial proteins from the staphylococcus albus; but this is merely an example, as any desired proportions may be used; or the lysed bacterial proteins from either the staphylococcus aureus or the staphylococcus albus may be used separately.

To 75 parts of the lysed bacterial proteins, whether single or mixed, I add 25 parts of sterile glycerine, (to make the final glycerine concentration substantially 25%) and add enough more sodium ethyl mercurithiosalicylate to maintain its concentration at 1:5000. Then I add some sterile jelly-forming material, such as sterile tragacanth, in suitable proportion to make a smoothly smearable but non-setting jelly of desirable consistency. It does not gel. With tragacanth, I have found that about 1.85% gives a desirable consistency.

The materials are desirably mixed in a suitable container that has been previously thoroughly cleaned and washed, desirably with a solution of sodium ethyl mercurithiosalicylate. It is desirable not to use ordinary germicides for such washing, such as phenol or cresol, because of their destructive effect on the bacteriophage.

The mixture of the lysed bacterial proteins, glycerin, and tragacanth, is stirred several times a day for several days, to secure homogeneity. This usually takes about 5 days. Then the substantially homogeneous mixture is filtered, under pressure, through an oil filter; which in the form I have used consists of a galvanized iron receptacle in which a fine-screen basket is suspended. In this way the jelly is made into an even smooth mass, and any foreign particles are removed. Sterility and titer tests are then made on the jelly; and the jelly is then filled into the proper containers.

If lysed bacterial proteins from other bacteria are used, they may be prepared in substantially the same manner as above outlined.

*Example II.—Mixed lysed gonococcus and staphylococcus proteins in vanishing cream*

Lysed bacterial proteins from the gonococcus are obtained in the manner above described for the staphylococcus.

These lysed bacterial proteins from the gonococcus and lysed bacterial proteins from staphylococcus aureus are mixed, for example in the proportion of 75 parts of the former to 25 parts of the latter. Then this mixture is homogeneously incorporated in an emulsion base, such as vanishing-cream, as in the proportion of 75 parts of the mixture of lysed bacterial proteins to 25 parts of vanishing-cream ingredients, with the broth containing the lysed bacterial proteins taking the place of some or all of the water ordinarily used in vanishing cream. Sodium ethyl mercurithiosalicylate is added, desirably to a concentration of 1:5000.

As in Example I, lysed bacterial proteins from other bacteria may be similarly used.

*Example III.—Lysed bacterial proteins in other bases*

Instead of using a water-soluble jelly or a vanishing cream as the viscous smoothly smearable base, I may use various ointment, cold-cream, oil, or lotion bases. For instance, lanolin makes an excellent base. So does ordinary cold-cream. The proportions of the mixture may vary to produce any desired consistency, so that the resultant final product is fairly smearable and viscous.

In the foregoing examples, I prefer to use lysed bacterial proteins which are obtained from young cultures lysed by bacteriophage. However, instead of having bacteriophage-lysed bacterial proteins, it is possible to use lysed bacterial proteins in which the lysis has been by autolysis. In this case, greater age of the cultures is usually necessary.

The preparations which are prepared as above outlined may be used for topical application on various infected areas.

Preparations as made according to Example I have been found very effective in the treatment of furunculosis, boils and carbuncles, impetigo and ulcers, and other similar infections. Through the use of these preparations on such lesions, one obtains a rapid decrease in congestion and pain and clearing up of the exudate and pus, and healthy granulations soon appear. Very resistant infections yield to this treatment, and rapid healing of the lesions results. Following treatment with these preparations, there is a quite general reduction in the amount of fibrous tissue produced, and consequent scar formation, as compared to that following older methods of treatment.

In a similar manner, the preparations described in Example II has been found quite effective in the treatment of certain gonococcal infections in which topical application of adequate amounts of the preparation can readily be made.

The preparations which are described in this application, like other biological preparations, should be stored at low temperature, desirably at ice-box temperature of between 0° and 5° C., and certainly not above ordinary room temperature of about 20° C. Some of the preparations described above have been stored for as long as two years (up to the beginning of 1933) with the merthiolate present throughout the period of storage; and have been found to have their bacteriophage transmissibility in series substantially as high at the end of the two years as it was when the preparations were first made, and as high as that of control preparations made without merthiolate was at either the beginning or the end of such a two-year storage period. If the preparations are kept at higher temperatures than 20° C., they gradually lose their bacteriophage effectiveness and their bacteriophage transmissibility in series. But even though they lose that bacteriophage effectiveness, they still have the effectiveness of some or all of the others of the four elements listed above as constituting the complete lysed bacterial proteins; and in addition the effectiveness of the merthiolate.

I claim as my invention:

1. A composition of matter, comprising lysed bacterial proteins mixed with a germicide comprising a water-soluble salt of a compound of mercury of the following general formula

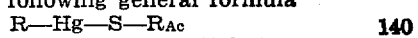

in which R is an aromatic or aliphatic group, $R_{Ac}$ is an organic radicle containing an acid group having a replaceable hydrogen ion, the Hg and the S atoms being bonded to carbon atoms of the R group and $R_{Ac}$ group respectively.

2. A composition of matter, comprising lysed bacterial proteins mixed with a germicide comprising a water soluble salt of mercurithiosalicylic acid.

3. A composition of matter, comprising lysed bacterial proteins mixed with a germicide comprising sodium ethyl mercurithiosalicylate.

4. A composition of matter, comprising lysed bacterial proteins in a viscous smoothly smearable non-setting base; mixed with a germicide comprising a water-soluble salt of a compound of mercury of the following general formula

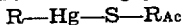

in which R is an aromatic or aliphatic group, $R_{Ac}$ is an organic radicle containing an acid group having a replaceable hydrogen ion, the Hg and the S atoms being bonded to carbon atoms of the R group and $R_{Ac}$ group respectively.

5. A composition of matter, comprising lysed bacterial proteins in a viscous smoothly smearable non-setting base, mixed with a germicide comprising a salt of mercurithiosalicylic acid.

6. A composition of matter, comprising lysed bacterial proteins in a viscous smoothly smearable non-setting base, mixed with a germicide comprising sodium ethyl mercurithiosalicylate.

FRANK G. JONES.

CERTIFICATE OF CORRECTION.

Patent No. 1,949,375.            February 27, 1934.

FRANK G. JONES.

It is hereby certified that error appears in the printed specification of the above numbered patent requiring correction as follows: Page 2, line 37, for the syllable "terial" read teria; page 3, line 105, for "preparations" read preparation; page 4, line 81, claim 5, before "salt" insert water-soluble; and that the said Letters Patent should be read with these corrections therein that the same may conform to the record of the case in the Patent Office.

Signed and sealed this 24th day of April, A. D. 1934.

Bryan M. Battey (Seal)            Acting Commissioner of Patents.

bacterial proteins mixed with a germicide comprising sodium ethyl mercurithiosalicylate.

4. A composition of matter, comprising lysed bacterial proteins in a viscous smoothly smearable non-setting base; mixed with a germicide comprising a water-soluble salt of a compound of mercury of the following general formula

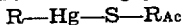

R—Hg—S—R$_{Ac}$ in which R is an aromatic or aliphatic group, R$_{Ac}$ is an organic radicle containing an acid group having a replaceable hydrogen ion, the Hg and the S atoms being bonded to carbon atoms of the R group and R$_{Ac}$ group respectively.

5. A composition of matter, comprising lysed bacterial proteins in a viscous smoothly smearable non-setting base, mixed with a germicide comprising a salt of mercurithiosalicylic acid.

6. A composition of matter, comprising lysed bacterial proteins in a viscous smoothly smearable non-setting base, mixed with a germicide comprising sodium ethyl mercurithiosalicylate.

FRANK G. JONES.

CERTIFICATE OF CORRECTION.

Patent No. 1,949,375.    February 27, 1934.

FRANK G. JONES.

It is hereby certified that error appears in the printed specification of the above numbered patent requiring correction as follows: Page 2, line 37, for the syllable "terial" read teria; page 3, line 105, for "preparations" read preparation; page 4, line 81, claim 5, before "salt" insert water-soluble; and that the said Letters Patent should be read with these corrections therein that the same may conform to the record of the case in the Patent Office.

Signed and sealed this 24th day of April, A. D. 1934.

Bryan M. Battey (Seal)    Acting Commissioner of Patents.